United States Patent
Casas et al.

(10) Patent No.: US 7,765,599 B2
(45) Date of Patent: Jul. 27, 2010

(54) MULTIMEDIA TRANSMITTER, MULTIMEDIA RECEIVER, MULTIMEDIA TRANSMISSION SYSTEM, AND METHOD FOR SECURELY TRANSMITTING MULTIMEDIA CONTENT OVER A WIRELESS LINK

(75) Inventors: Eduardo F. Casas, Duncan (CA); Gregory Peek, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1023 days.

(21) Appl. No.: 11/463,238

(22) Filed: Aug. 8, 2006

(65) Prior Publication Data
US 2007/0300266 A1    Dec. 27, 2007

Related U.S. Application Data

(60) Provisional application No. 60/813,576, filed on Jun. 13, 2006.

(51) Int. Cl.
*G06F 11/30* (2006.01)
*H04K 1/00* (2006.01)

(52) U.S. Cl. .................. 726/26; 713/189; 380/270; 380/255

(58) Field of Classification Search ............... 725/29; 713/189; 714/155; 709/231, 232, 228; 340/270, 340/255; 370/401; 726/22, 23, 27, 26; 380/270, 380/255, 277; 455/26.1; 705/57
See application file for complete search history.

(56) References Cited

U.S. PATENT DOCUMENTS

| | | | |
|---|---|---|---|
| 5,852,664 A | | 12/1998 | Iverson et al. |
| 5,987,316 A | * | 11/1999 | Gordon et al. ............... 455/411 |
| 6,327,688 B1 | * | 12/2001 | Stolitzka et al. ............. 714/750 |
| 7,337,470 B2 | * | 2/2008 | Katz et al. .................... 726/22 |
| 2003/0110383 A1 | | 6/2003 | Garay et al. |
| 2006/0092959 A1 | | 5/2006 | Unger |
| 2006/0209745 A1 | * | 9/2006 | MacMullan et al. ......... 370/328 |

FOREIGN PATENT DOCUMENTS

JP    2004-207965    7/2004

(Continued)

OTHER PUBLICATIONS

"Data integrity with hash functions." Microsoft Technet. Jan 21, 2005. Microsoft, Web. <http://technet.microsoft.com/en-us/library/cc736330(WS.10).aspx>.*

(Continued)

*Primary Examiner*—Kambiz Zand
*Assistant Examiner*—Imhotep Durham
(74) *Attorney, Agent, or Firm*—Schwegman, Lundberg & Woessner, P.A.; Gregory J. Gorrie

(57) ABSTRACT

Embodiments of multimedia transmitters, receivers and methods for communicating multimedia content in a wireless network are generally described herein. Other embodiments may be described and claimed. In some embodiments, a checksum is generated by decoding the multimedia content to respond to queries from a multimedia content source within a predetermined time period, a propagation delay associated with the wireless multimedia link is determined, and transmission of the multimedia content over the wireless multimedia link is inhibited when a response from the multimedia receiver exceeds a propagation delay by a predetermined time period.

23 Claims, 5 Drawing Sheets

FOREIGN PATENT DOCUMENTS

| WO | WO-2007146737 A2 | 12/2007 |
|---|---|---|
| WO | WO-2007146737 A3 | 12/2007 |

OTHER PUBLICATIONS

Y. C. Hu, A. Perrig, and D. B. Johnson, Packet leashes: a defense against wormhole attacks in wireless networks, Technical Report TR01-384, 2002.*

Timeout. In Microsoft Computer Dictionary. Microsoft Press 2002.*

Bulletin No. 70. Jul. 1997. Millimeter Wave Propagation: Spectrum Management Implications. Federal Communications Commission: Office of Engineering and Technology.*

"High-Bandwidth Digital Content Protection System, Revision 1.1", *Digital Content Protection LLC, C/O Vital Technical Marketing, Inc.*, 5440 SW Westgate Drive, Ste. 217, Portland, OR 97221, (Jun. 9, 2003), -85.

"High-Definition Multimedia Interface, Specification Version 1.2a and Supplement 1 Consumer Electronics Control (CEC)", *HDMI Licensing, LLC*, Copyright 2001-2005, (Dec. 14, 2005), 1-110 and CEC 1-62.

"VESA DisplayPort Standard Version 1", *Video Electronics Standards Association*, 860 Hillview Court, Ste. 150, Milpitas, CA 95305, Copyright 2006, (May 1, 2006), 1-205.

* cited by examiner

MULTIMEDIA TRANSMITTER

MULTIMEDIA RECEIVER

RESPONSE FRAME

MULTIMEDIA TRANSMITTER, MULTIMEDIA RECEIVER, MULTIMEDIA TRANSMISSION SYSTEM, AND METHOD FOR SECURELY TRANSMITTING MULTIMEDIA CONTENT OVER A WIRELESS LINK

PRIORITY CLAIM

This application claims the benefit of priority to U.S. Provisional Patent Application Ser. No. 60/813,576, filed Jun. 13, 2006, which is incorporated herein by reference.

TECHNICAL FIELD

Some embodiments of the present invention pertain to wireless communications. Some embodiments of the present invention relate to wireless multimedia transmission. Some embodiments of the present invention relate to the High Definition Multimedia Interface (HDMI) protocol and the Display Port (DP) protocol. Some embodiments of the present invention relate to multimedia content protection techniques, such as the High-Bandwidth Digital Content Protection (HDCP) and the Display Port Content Protection (DPCP) techniques.

BACKGROUND

Systems that provide digital multimedia content generally employ one or more content protection schemes to prevent the unauthorized duplication of digital content. Some content protection methods establish a one-way encrypted wired link between a source, such as a high-definition (HD) digital video disk (DVD) player, and a sink, such as an HD display. The source may authenticate the sink using encryption keys that are stored securely within the devices, and the source and the sink may establish session keys to communicate the encrypted content.

Some content protection schemes may limit the distance between the source and the sink by requiring that responses from the sink be received within predetermined time periods. This may work fine for wired links, but additional delays introduced by wireless links make these content protection schemes unsuitable for wireless applications.

Thus, there are general needs for systems and methods for securely transmitting multimedia content over a wireless link. There are also general needs for systems and methods for securely transmitting multimedia content over a wireless link that meet the requirements imposed by some content protection schemes.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
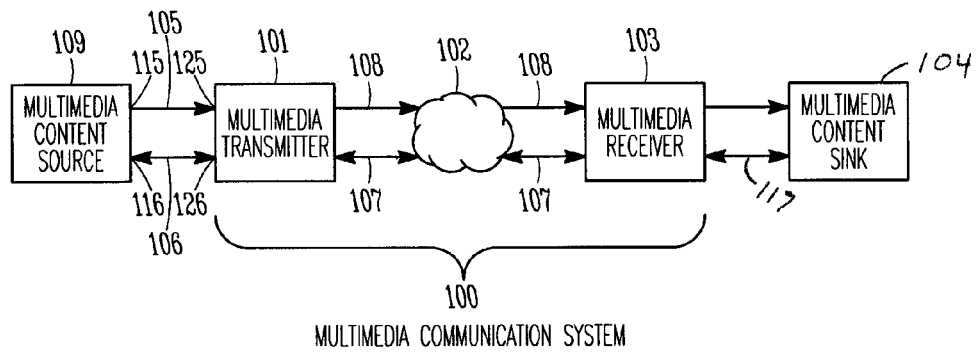
FIG. 1 is a block diagram of a multimedia communication system in accordance with some embodiments of the present invention.

FIG. 1 is a block diagram of a multimedia communication system in accordance with some embodiments of the present invention. Multimedia communication system 100 receives encrypted multimedia content 105 from multimedia content source 109, transmits the content through wireless channel 102 and provides the content to multimedia content sink 104. Multimedia communication system 100 includes multimedia transmitter 101 and multimedia receiver 103.

In accordance with some embodiments, multimedia transmitter 101 transmits encrypted multimedia content over wireless multimedia link 108 to multimedia receiver 103. Multimedia transmitter 101 may also decode the multimedia content to generate a checksum ($R_i'$) to respond to queries from multimedia content source 109 with the checksum within a predetermined time period. The queries from multimedia content source 109 may be received over wired control link 106 and responses to the queries may be provided to multimedia content source 109 over wired control link 106.

Multimedia transmitter 101 may also determine a propagation delay between multimedia transmitter 101 and multimedia receiver 103. In accordance with some embodiments, multimedia transmitter 101 may inhibit the transmission of the multimedia content over multimedia link 108 when a response from multimedia receiver 103 exceeds the propagation delay by a predetermined time period, although the scope of the invention is not limited in this respect. In some embodiments, the predetermined time period may be about 1 millisecond (ms), although the scope of the invention is not limited in this respect as other predetermined time periods may also be suitable.

In some embodiments, multimedia transmitter 101 may determine the propagation delay from a delay value received from multimedia receiver 103 within a response. The delay value may be secured with a hash, although the scope of the invention is not limited in this respect. In these embodiments, multimedia transmitter 101 may be able to securely determine the true propagation delay between multimedia transmitter 101 and multimedia receiver 103. In some embodiments, the hash may be a one-way hash and the delay value and the hash may be received over wireless control link 107.

In some embodiments, multimedia content source 109 may refrain from providing encrypted multimedia content 105 to multimedia transmitter 101 when a delay in receiving the checksum provided by multimedia transmitter 101 exceeds the predetermined time period or if the checksum does not match a current checksum ($R_i$) generated within multimedia content source 109, although the scope of the invention is not limited in this respect.

In some embodiments, multimedia content source 109 and multimedia transmitter 101 may generate checksums on a regular basis (e.g., every 128 frames). In some embodiments, multimedia transmitter 101 may generate the checksum from the decoding of encrypted multimedia content 105 in response to queries from multimedia content source 109, although the scope of the invention is not limited in this respect.

These embodiments of the present invention may allow multimedia content source 109 to provide multimedia content to multimedia content sink 104 through wireless channel 102 even when the propagation delay, the signal processing delay and the channel access delay associated with wireless transmission exceed a predetermined time period that may be required by multimedia content source 109 to receive checksums. Conventionally, multimedia content source 109 and multimedia content sink 104 are coupled directly and do not have the added delays associated with the use of wireless channel 102. Embodiments of the present invention may allow multimedia content source 109 to receive responses with current checksums within the predetermined time period while enforcing restrictions on a maximum propagation delay.

In some embodiments, multimedia content source 109 may initially perform an authentication process to authenticate multimedia transmitter 101. In these embodiments, an authentication process may be performed between an encoder of multimedia content source 109 and a decoder of multimedia transmitter 101. This authentication process may be performed over wired control link 106 and may be performed using secret keys securely stored within multimedia content source 109 and/or multimedia transmitter 101. In some embodiments, as part of the authentication process, session keys may be generated for encrypting and decrypting the multimedia content. Other authentication processes may be similarly performed between encoder/decoder pairs within multimedia communication system 100.

In some embodiments, multimedia transmitter 101 may have primary data interface 125 to couple with primary data interface 115 of multimedia content source 109 to receive multimedia content 105 from multimedia content source 109. In some embodiments, multimedia transmitter 101 may also have secondary control interface 126 to couple with secondary control interface 116 of multimedia content source 109 to receive queries from multimedia content source 109 and to provide responses to the queries. Responses and queries are discussed in more detail below. In some embodiments, primary data interfaces 115 and 125 and secondary control interfaces 116 and 126 may operate in accordance with either the High Definition Multimedia Interface (HDMI) protocol (referenced below) or the Display Port (DP) protocol (referenced below), although the scope of the invention is not limited in this respect. In some embodiments, multimedia content source 109 and multimedia content sink 104 may implement a content protection technique, such as the High-Bandwidth Digital Content Protection (HDCP) technique, or the Display Port Content Protection (DPCP) technique, although the scope of the invention is not limited in this respect. In some embodiments that implement HDCP version 1.1, a maximum time period for a multimedia content source to receive responses from a multimedia content sink is 1 ms. In some embodiments, primary data interfaces 115 and 125 may comprise either Transition-Minimized Differential Signaling (TMDS) interfaces or Low Voltage Differential Swing (LVDS) interfaces, although the scope of the invention is not limited in this respect. In some embodiments, secondary control interfaces 116 and 126 may comprise either a two-wire serial ($I^2C$) interface or an auxiliary (AUX) interface, although the scope of the invention is not limited in this respect.

In some embodiments, wired control link 106, wireless control link 107, and wired control link 117 may be used to implement the HDMI protocol including the negotiation of formats between multimedia content source 109 and multimedia content sink 104, although the scope of the invention is not limited in this respect. In these embodiments, multimedia transmitter 101 forwards control messages from multimedia content source 109 over wireless control link 107 to multimedia receiver 103, and multimedia receiver 103 forwards control messages from multimedia content sink 104 over wireless control link 107 to multimedia transmitter 101.

Figure 2A:
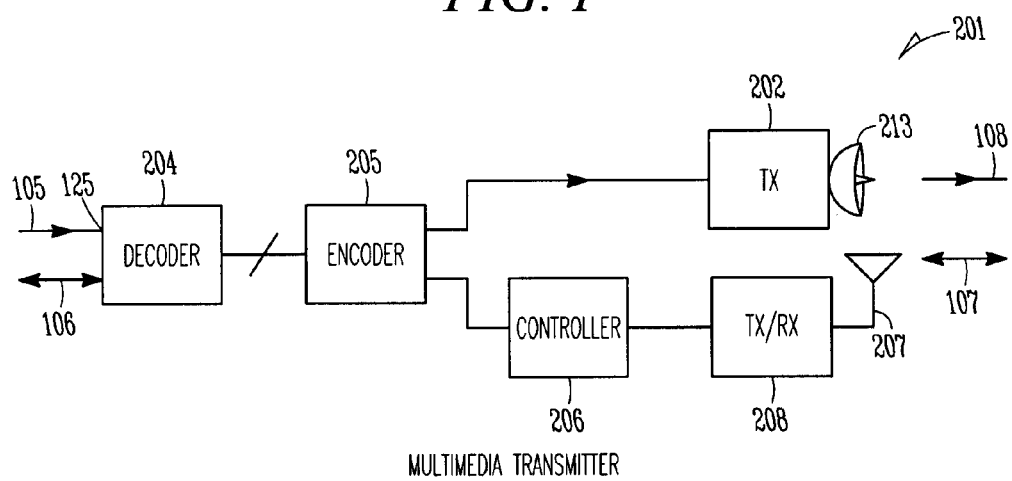
FIG. 2A is a block diagram of a multimedia transmitter in accordance with some embodiments of the present invention.

FIG. 2A is a block diagram of a multimedia transmitter in accordance with some embodiments of the present invention. Multimedia transmitter 201 may be suitable for use as multimedia transmitter 101 (FIG. 1), although other transmitters may also be suitable.

In these embodiments, multimedia transmitter 201 may include decoder 204 to decrypt multimedia content 105 received from multimedia content source 109 (FIG. 1) through primary data interface 125 and generate a checksum from the decryption of encrypted multimedia content 105. Decoder 204 may also respond to queries from multimedia content source 109 over wired control link 106 with the checksum within the predetermined time period discussed above.

In these embodiments, multimedia transmitter 201 may also include encoder 205 and transmitter circuitry (TX) 202. Encoder 205 may re-encrypt decrypted multimedia content provided by decoder 204 and may provide the re-encrypted multimedia content to transmitter circuitry 202. Transmitter circuitry 202 may transmit the re-encrypted multimedia content over wireless multimedia link 108 to multimedia receiver 103 (FIG. 1) using antenna 213.

In these embodiments, multimedia transmitter 201 may also include controller 206 and transceiver circuitry (TX/RX) 208 for communicating (i.e., both sending and receiving) over control link 107 using antenna 207. Controller 206 may determine the propagation delay between multimedia transmitter 201 and multimedia receiver 103 (FIG. 1). Controller 206 may also inhibit transmission of the multimedia content over multimedia link 108 when a response from the multimedia receiver 103 (FIG. 1) exceeds the propagation delay by a predetermined time period. In some embodiments, controller 206 may compare a hash received over control link 107 with a hash of a checksum generated by encoder 205. In some embodiments, the received hash may have been generated from a checksum provided by multimedia content sink 104 (FIG. 1), although the scope of the invention is not limited in this respect. In some alternate embodiments, the received hash may have been generated from a checksum provided by a decoder within multimedia receiver 103 (FIG. 1), although the scope of the invention is not limited in this respect.

In some embodiments, controller 206 may instruct encoder 205 to refrain from providing the re-encrypted multimedia content to transmitter circuitry 202 when the hash received over control link 107 does not match the hash generated by the encoder 205. In these embodiments, controller 206 may also instruct encoder 205 to refrain from providing the re-encrypted multimedia content to transmitter circuitry 202 when the propagation delay subtracted from a delay in receiving the hash over control link 107 exceeds the predetermined time period. In these embodiments, when multimedia receiver 103 (FIG. 1) fails to provided the proper value for the hash or when the hash is not provided quick enough, transmission of the multimedia content by transmitter circuitry 202 may be terminated.

Figure 2B:
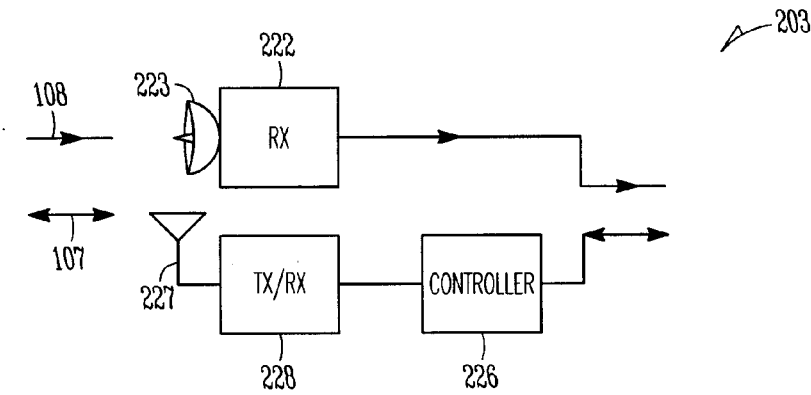
FIG. 2B is a block diagram of a multimedia receiver in accordance with some embodiments of the present invention.

FIG. 2B is a block diagram of a multimedia receiver in accordance with some embodiments of the present invention. Multimedia receiver 203 may be suitable for use as multimedia receiver 103 (FIG. 1), although other receivers may also be suitable. Multimedia receiver 203 includes receiver circuitry (RX) 222 to receive encrypted multimedia content over wireless multimedia link 108 from multimedia transmitter 101 (FIG. 1) using antenna 223. Multimedia receiver 203 also includes wireless transceiver (TX/RX) 228 to communicate over control link 107 with multimedia transmitter 101 (FIG. 1) using antenna 227. Multimedia receiver 203 also includes controller 226. In some embodiments, wireless transceiver 228 may receive a query over wireless control link 107. Controller 226 may provide a hash of a checksum and a delay value to multimedia transmitter 101 (FIG. 1) over the control link 107 in response to the query, although the scope of the invention is not limited in this respect.

In some embodiments, the checksum may be retrieved by controller 226 from multimedia content sink 104 (FIG. 1), and controller 226 may determine the delay value based on a time of receipt of the query from multimedia transmitter 101 (FIG. 1). In these embodiments, controller 226 may also generate the hash of both the checksum and the delay value for transmission to multimedia transmitter 101 (FIG. 1) over control link 107 as the response. In some embodiments, the hash may be a one-way hash generated using the session keys discussed above. These embodiments are discussed in more detail below.

Figure 3A:
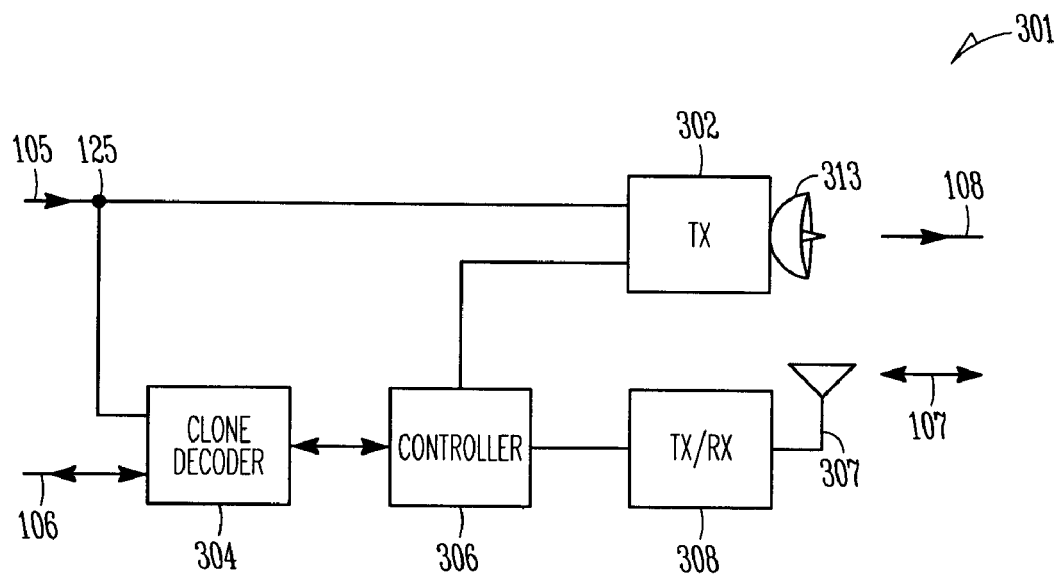
FIG. 3A is a block diagram of a multimedia transmitter in accordance with some alternate embodiments of the present invention.

FIG. 3A is a block diagram of a multimedia transmitter in accordance with some alternate embodiments of the present invention. Multimedia transmitter 301 may be suitable for use as multimedia transmitter 101 (FIG. 1), although other transmitters may also be suitable. In these embodiments, multimedia transmitter 301 may include clone decoder 304 to decrypt multimedia content 105 received from multimedia content source 109 (FIG. 1) through primary data interface 125. Clone decoder 304 may also generate a checksum from the decryption of encrypted multimedia content 105. Clone decoder 304 may also respond to queries from multimedia content source 109 (FIG. 1) with the checksum within the predetermined time period discussed above. In these embodiments, multimedia transmitter 301 may also include transmitter circuitry (TX) 302 to transmit encrypted multimedia content 105 received directly from multimedia content source 109 (FIG. 1) over wireless multimedia link 108 to multimedia receiver 103 (FIG. 1) using antenna 313.

In these embodiments, multimedia transmitter 301 may also include controller 306 and transceiver circuitry (TX/RX) 308 for communicating over control link 107 using antenna 307. Controller 306 may determine the propagation delay between multimedia transmitter 301 and multimedia receiver 103 (FIG. 1). Controller 306 may also inhibit transmission of the multimedia content over multimedia link 108 when a response from multimedia receiver 103 (FIG. 1) exceeds the propagation delay by a predetermined time period. In some embodiments, controller 306 may compare a hash received over control link 107 with a hash of a checksum generated by clone decoder 304. In some embodiments, controller 306 may inhibit the transmission of the multimedia content by the transmitter circuitry 302 when the hash of the checksums do not match or when the propagation delay subtracted from a delay in receiving the hash from multimedia receiver 103 (FIG. 1) exceeds the predetermined time period, although the scope of the invention is not limited in this respect.

In some of these embodiments, controller 306 may use the delay value received in the response from multimedia receiver 103 (FIG. 1) to subtract out the signal processing and channel access delay so that the two-way propagation delay may be determined, although the scope of the invention is not limited in this respect. In some embodiments, controller 306 may inhibit the transmission of the multimedia content to multimedia receiver 103 (FIG. 1) by instructing clone decoder 304 to refrain from providing a current checksum to multimedia content source, although the scope of the invention is not limited in this respect. In some embodiments, the hash of the checksum received over control link 107 may either be generated by a decoder of multimedia receiver 103 (FIG. 1) or generated from a checksum provided by a decoder of multimedia content sink 104 (FIG. 1), although the scope of the invention is not limited in this respect.

In some embodiments, transmitter circuitry 302 receives encrypted multimedia content 105 directly from multimedia content source 109 (FIG. 1) for subsequent re-transmission over multimedia link 108. In these embodiments, clone decoder 304 may decrypt encrypted multimedia content 105 to generate checksums in response to queries from multimedia content source 109 (FIG. 1). In these embodiments, controller 306 may disable the clone decoder 304 to inhibit the generation of a checksum for providing to multimedia content source 109 (FIG. 1) when a hash of the checksum from clone decoder 304 does not match the hash received from multimedia receiver 103 (FIG. 1), although the scope of the invention is not limited in this respect.

Figure 3B:
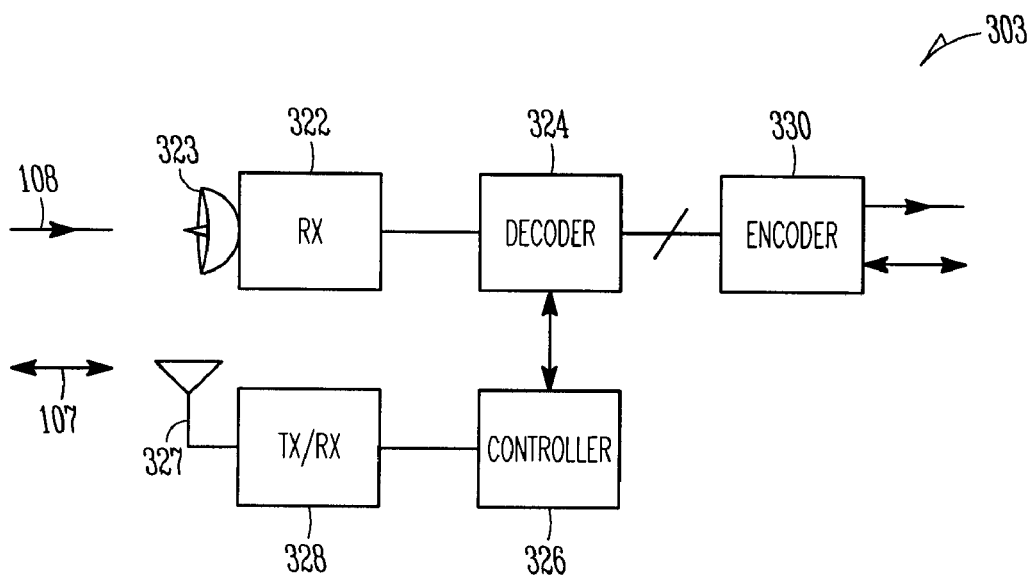
FIG. 3B is a block diagram of a multimedia receiver in accordance with some alternate embodiments of the present invention.

FIG. 3B is a block diagram of a multimedia receiver in accordance with some alternate embodiments of the present invention. Multimedia receiver 303 may be suitable for use as multimedia receiver 103 (FIG. 1), although other receivers may also be suitable. Multimedia receiver 303 includes receiver circuitry (RX) 322 to receive encrypted multimedia content over wireless multimedia link 108 from multimedia transmitter 101 (FIG. 1) using antenna 323. Multimedia receiver 303 also includes wireless transceiver 328 to communicate over control link 107 with multimedia transmitter 101 (FIG. 1) using antenna 327. Multimedia receiver 303 also includes controller 326. In some embodiments, wireless transceiver (TX/RX) 328 may receive a query over wireless control link 107, and controller 326 may provide a hash of a checksum and a delay value to multimedia transmitter 101 (FIG. 1) over the control link 107 in response to the query, although the scope of the invention is not limited in this respect.

In these embodiments, multimedia receiver 303 may also include decoder 324 to decrypt the encrypted multimedia content received from multimedia transmitter 101 (FIG. 1) and to generate the checksum. In these embodiments, controller 326 may determine the delay value based on a time of receipt of the query from multimedia transmitter 101 (FIG. 1). Controller 326 may generate the hash of the checksum and the delay value for transmission to multimedia transmitter 101 (FIG. 1) over the control link 107 as the response, although the scope of the invention is not limited in this respect.

In these embodiments, multimedia receiver 303 may also include encoder 330 to re-encrypt the decoded multimedia content provided by decoder 324. In these embodiments, the re-encrypted multimedia content may be provided directly to multimedia content sink 104 (FIG. 1). In these embodiments, encoder 330 may receive checksums directly from multimedia content sink 104 (FIG. 1), although the scope of the invention is not limited in this respect. In these embodiments, controller 326 may read a checksum from decoder 324 and may send a hash generated from the checksum to controller 306 (FIG. 3A) of multimedia transmitter 301 (FIG. 3A). Controller 306 (FIG. 3A) may compare the received hash to a hash of a checksum generated in clone decoder 304 (FIG. 3A).

In some embodiments, multimedia transmitter 201 (FIG. 2A) may be suitable for use as multimedia transmitter 101 (FIG. 1) when either multimedia receiver 203 (FIG. 2B) or multimedia receiver 303 (FIG. 3B) is used for multimedia receiver 103 (FIG. 1). In some embodiments, multimedia transmitter 301 (FIG. 3A) may be suitable for use as multimedia transmitter 101 (FIG. 1) when multimedia receiver 303 (FIG. 3B) is used for multimedia receiver 103 (FIG. 1). Although multimedia transmitter 201 (FIG. 2A), multimedia transmitter 301 (FIG. 3A), multimedia receiver 203 (FIG. 2B) and multimedia receiver 303 (FIG. 3B) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements may refer to one or more processes operating on one or more processing elements.

Figure 4:
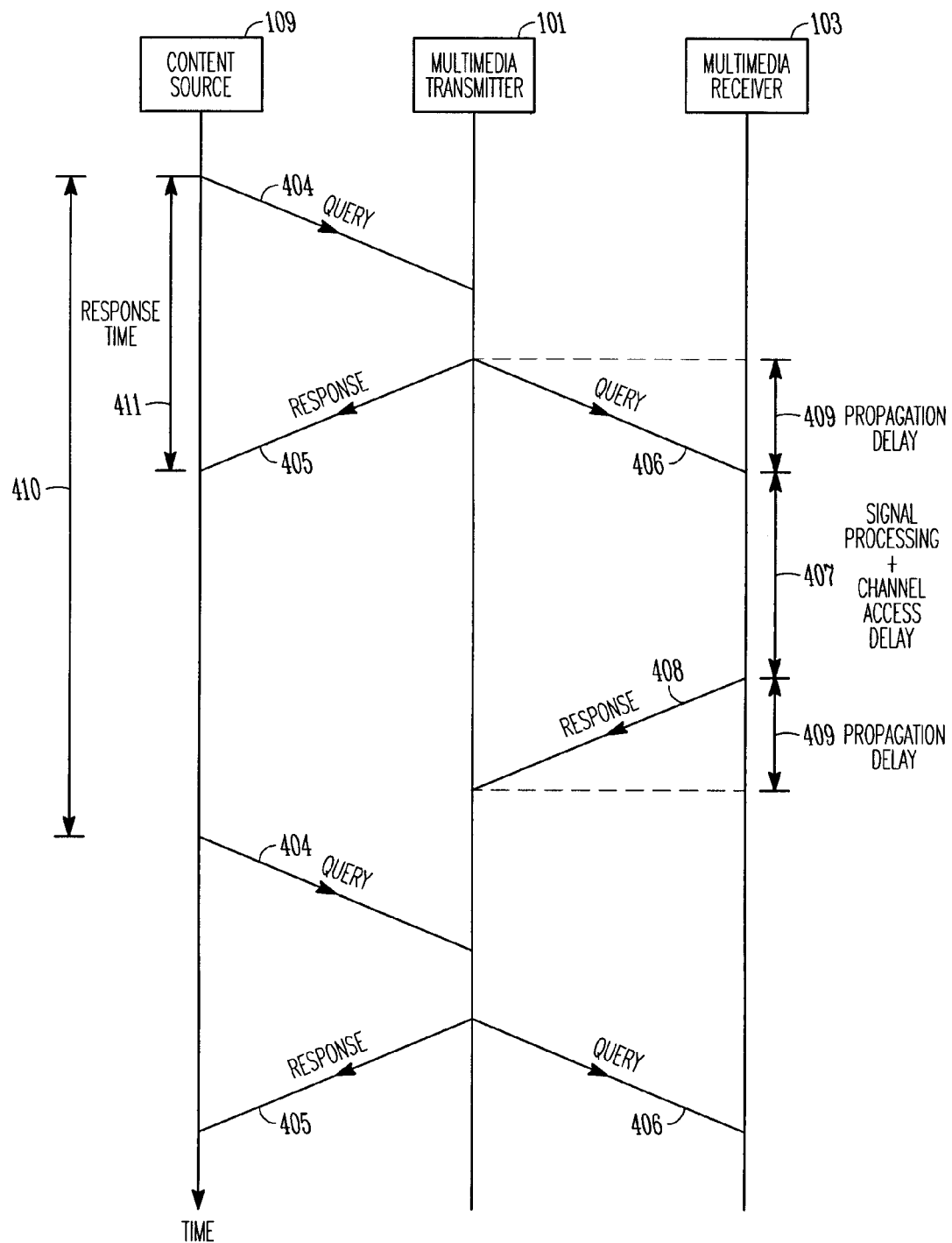
FIG. 4 illustrates some communications between a multimedia content source, a multimedia transmitter and a multimedia receiver in accordance with some embodiments of the present invention.

FIG. 4 illustrates some communications between a multimedia content source, a multimedia transmitter and a multimedia receiver in accordance with some embodiments of the present invention. As illustrated in FIG. 4, queries 404 are received at multimedia transmitter 101 from multimedia content source 109. Responses 405 are provided by multimedia transmitter 101 to multimedia content source 109 in response to queries 404. Queries 406 are sent from multimedia transmitter 101 to multimedia receiver 103 and responses 408 are received from multimedia receiver 103 by multimedia transmitter 101.

In some embodiments, responses 405 are provided within response time 411, which may be less than or equal to the predetermined time period required by multimedia content source 109. In some embodiments, multimedia content source 109 may send queries 404 on a regular basis indicated by time 410. As discussed above, multimedia transmitter 101 may determine propagation delay 409 based on a delay value received in response 408 and may subtract out signal processing and channel access delay 407.

Figure 5:
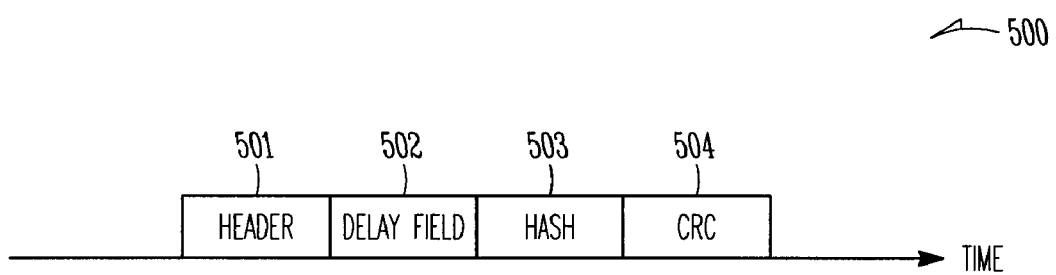
FIG. 5 illustrates a response frame in accordance with some embodiments of the present invention.

FIG. 5 illustrates a response frame in accordance with some embodiments of the present invention. Response frame 500 may be sent from a multimedia receiver, such as multimedia receiver 103 (FIG. 1), to a multimedia transmitter, such as multimedia transmitter 101 (FIG. 1). In some embodiments, response frame 500 may correspond to response 408 (FIG. 4). Response frame 500 may include header 501, delay field 502, hash 503 and cyclic redundancy check (CRC) 504, although other fields may also be included. Hash 503 may comprise a hash of both a checksum and the value in delay field. In these embodiments, the value in delay field may comprise the delay value discussed above. In some embodiments, header 501 may comprise a media access control (MAC) header, although the scope of the invention is not limited in this respect.

The following description refers to FIGS. 1 through 5. In some embodiments, a controller, such as controller 206 or controller 306, may be responsive to queries 404 received from multimedia content source 109 by causing multimedia transmitter 101 to send queries 406 to multimedia receiver 103 over control link 107 for the hash of the checksum generated by multimedia content sink 104. In these embodiments, the controller may receive responses 408 from multimedia receiver 103. In some embodiments, responses 408 may include delay field 502 and hash 503. In some embodiments, delay field 502 may include a delay value, and hash 503 may be a one-way hash of both the delay value and the checksum generated by multimedia receiver 103, although the scope of the invention is not limited in this respect. In some embodiments, the delay value may be a time stamp or other value that may be used to determine an elapsed time.

In some embodiments, a decoder, such as decoder 204 or clone decoder 304, may be responsive to queries 404 received from multimedia content source 109 to provide a current checksum generated by the decoder and provided to multimedia content source 109 as part of responses 405, although the scope of the invention is not limited in this respect. In these embodiments, queries 404 may trigger both queries 406 to multimedia receiver 103 as well as responses 405 back to multimedia content source 109. In some embodiments, responses 408 sent by multimedia receiver 103 may include hash 503, which may comprise a hash of both the checksum and the value in delay field 502, rather than an actual checksum. Responses 405, on the other hand, may comprise a checksum generated by the decoder (e.g., either decoder 204 or clone decoder 304). In some embodiments, queries 406 may comprise a request for the hash of the checksum generated either by decoder 324 or by a decoder of a multimedia content sink 104, although the scope of the invention is not limited in this respect. In some alternate embodiments, responses 408 may comprise an actual checksum generated by either a decoder within multimedia content sink 104 or decoder 324, although the scope of the invention is not limited in this respect.

In some embodiments, multimedia transmitter 101 may send queries 406 to multimedia receiver 103 over wireless control link 107 and may receive secured responses 408 over the wireless control link 107. In some embodiments, control link 107 may be a separate control link that may be orthogonal in frequency to multimedia link 108, although the scope of the invention is not limited in this respect.

In some embodiments, wireless transceivers 208, 308, 228 and/or 328 may comprise a wireless local area network (WLAN) transceiver, such as a Wireless Fidelity (WiFi) transceiver or a transceiver configured to communicate in accordance with one of the IEEE 802.11 standards referenced below, although the scope of the invention is not limited in this respect.

In some embodiments, the use of delay field 502 may help avoid the complexity of establishing an absolute time reference common to both multimedia transmitter 101 and multimedia receiver 103. In these embodiments, the controller (i.e., either controller 206 or controller 306) may subtract the delay value provided in delay field 502 from the total round-trip delay to determine propagation delay 409. In some embodiments, the controller may subtract the time that query 406 was sent and the delay value received in delay field 502 from the time that response 408 is received to compute propagation delay 409. In some embodiments, propagation delay 409 should be less than a predetermined time period. In some embodiments, propagation delay 409 is a two-way propagation delay that should be less than 1 ms to meet the HDCP specification, although the scope of the invention is not limited in this respect.

In these embodiments, multimedia receiver 103 may provide a delay value in delay field 502 to compensate for different numbers of retransmissions. In some embodiments, the use of a delay value in delay field 502 may allow for receiver implementations with different signal processing delays.

In some embodiments, the delay value in delay field 502 may be protected against a "man in the middle" attack by transmitting a hash of both the delay value and the checksum as hash 503 (i.e., rather than just transmitting the checksum). A "man in the middle" attack may attempt to alter (e.g., increase) the value of delay field 502. When the controller (either controller 206 or controller 306) verifies the value of hash 503 instead of just the checksum, the controller confirms that multimedia receiver 103 used the correct value of the checksum in generating the hash and that the value in delay field 502 has not been altered. In these embodiments, hash 503 may be a one-way hash generated using a hash algorithm, such as either the MD5 or SHA hash algorithms, although the scope of the invention is not limited in this respect. In some embodiments, hash 503 may be computed from a concatenation of a hash of the checksum and a delay value, although the scope of the invention is not limited in this respect. In some other embodiments, public-key encryption and signatures may be used to verify the integrity of communications over control link 107.

In some embodiments, CRC 504 may be used to verify that response frame 500 has been correctly received. In these embodiments, when response frame 500 is not correctly received, multimedia receiver 103 may not necessarily receive an acknowledge (ACK) frame back from multimedia transmitter 101 and may retransmit the response frame 500 with a new delay value in delay field 502 and a new hash value for hash 503.

In some embodiments, reliable delivery of queries 406 and responses 408 over control link 107 may be ensured by using ACK frames implemented in accordance with an underlying protocol, such as a protocol in accordance with one of the IEEE 802.11 standards referenced below. In some embodiments, a three way handshake (i.e., query, response and ACK) together with timeouts and retransmissions for lost messages may be used to help ensure reliable delivery of queries 406 and responses 408, although the scope of the invention is not limited in this respect.

In some embodiments, propagation delay 409 may be determined by examination of the delay value in delay field 502. In some embodiments, a timestamp may be provided as the value of a timer which may starts counting from zero at a known rate (e.g., 1 MHz) when query 406 is received and whose value is inserted, together with data to ensure integrity and authentication as described above, into response frame 500 immediately before the response frame 500 is transmitted. In some IEEE 802.11 embodiments, a maximum contention window size may be set to zero to avoid unknown backoff delays. In these embodiments, retransmissions may be disabled to avoid retransmission delays, although the scope of the invention is not limited in this respect.

In some embodiments, multimedia link 108 may comprise a high throughput millimeter-wave link. In these millimeter-wave embodiments, one or more of antennas 213, 223, 313 and/or 323 may comprise directional antennas for communicating encrypted multimedia content at millimeter-wave frequencies. The millimeter-wave frequencies may range between approximately 57 and 90 gigahertz (GHz), although the scope of the invention is not limited in this respect.

In some of these millimeter-wave embodiments, one or more of antennas 213, 223, 313 and/or 323 may comprise a steerable array antenna comprising a plurality of antenna elements, although the scope of the invention is not limited in this respect. In some of these embodiments, the steerable array antennas may comprise a chip-array antenna fabricated on a single semiconductor die. In some embodiments, the chip-array antenna may comprise a steerable chip-lens array antenna comprising a millimeter-wave lens and a chip-array comprising an array of antenna elements. The chip-lens array may generate an incident beam of millimeter-wave signals, and the array of antenna elements may be coupled to the beam-steering circuitry to direct the incident beam within the millimeter-wave lens to steer the antenna beam. In some other embodiments, the chip-array antenna may comprise a chip-array reflector antenna comprising an internal millimeter-wave reflector and a chip array comprising an array of antenna elements to generate an incident beam of millimeter-wave signals. In these embodiments, the array of antenna elements may be coupled to the beam-steering circuitry to direct the incident beam at the internal millimeter-wave reflector to steer the antenna beam.

In some alternate embodiments, any one of the directional antennas 213, 223, 313, and/or 323 may comprise a phased array antenna, a horn antenna, a reflector antenna, a slot antenna, or a slotted-waveguide antenna, although other types of antennas, including omnidirectional antennas, may also be suitable.

In some embodiments, one or more of antennas 207, 227, 307 and/or 327 may comprise directional or omnidirectional antennas, including, for example, dipole antennas, monopole antennas, patch antennas, loop antennas, microstrip antennas or other types of antennas suitable for transmission of RF signals over control link 107.

Figure 6:
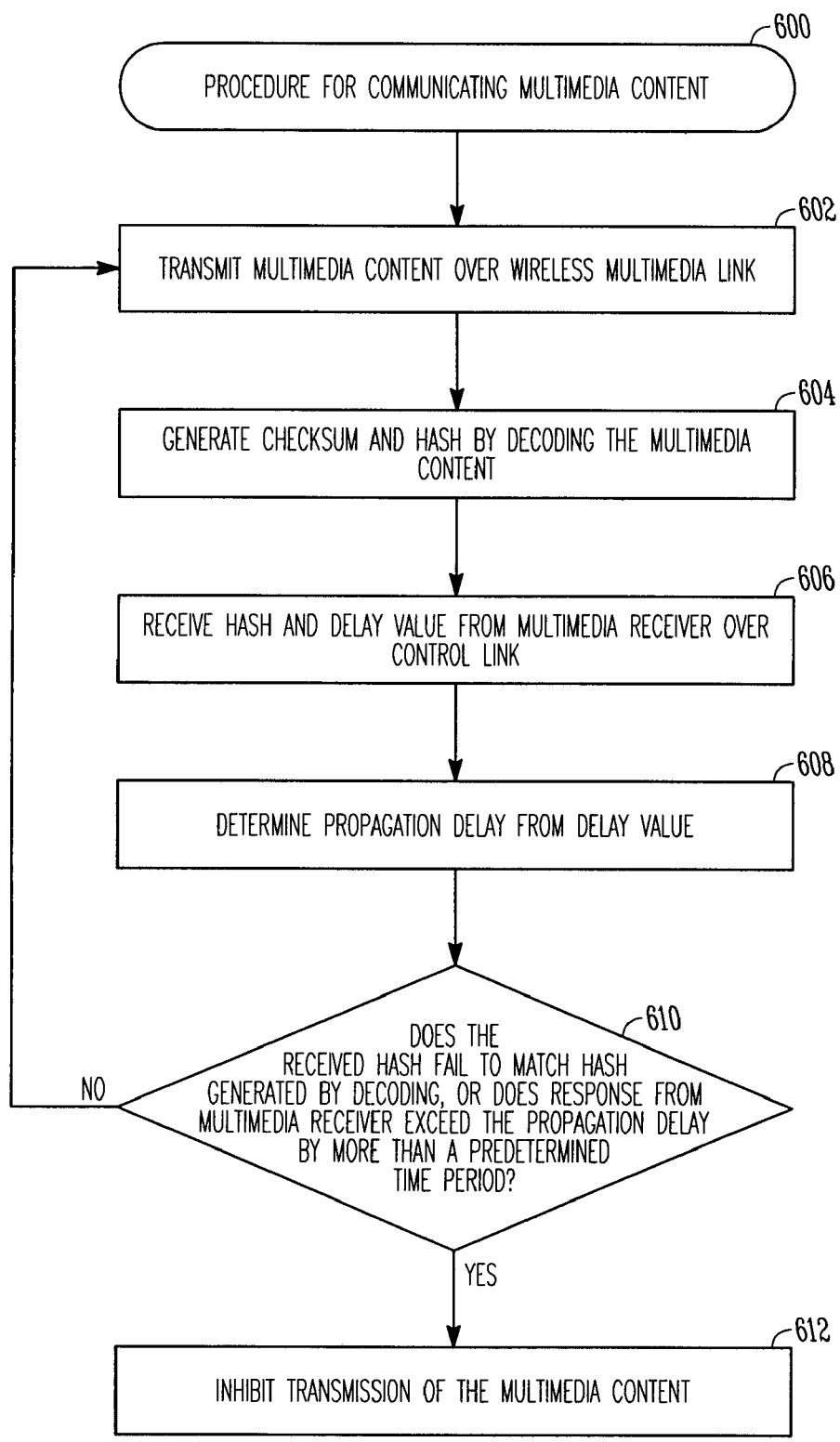
FIG. 6 is a procedure for communicating multimedia content in accordance with some embodiments of the present invention.

FIG. 6 is a procedure for communicating multimedia content in accordance with some embodiments of the present invention. Procedure 600 may be performed by a multimedia transmitter, such as multimedia transmitter 101 (FIG. 1) to securely communicate multimedia content over a wireless channel, such as wireless channel 102 (FIG. 1), with a multimedia receiver, such as multimedia receiver 103 (FIG. 1), although the scope of the invention is not limited in this respect.

Operation 602 comprises transmitting the multimedia content over a wireless multimedia link to a multimedia receiver. Operation 602 may include receiving multimedia content from a multimedia content source, such as multimedia content source 109 (FIG. 1) and transmitting the received multimedia content with transmitter circuitry, such as transmitter circuitry 202 (FIG. 2A) or transmitter circuitry 302 (FIG. 3A). In some embodiments, the multimedia content may be decrypted and re-encrypted prior to transmission, although the scope of the invention is not limited in this respect.

Operation 604 comprises generating a checksum and hash by decoding the multimedia content. In some embodiments, operation 604 may comprise decoding the multimedia content by decoder 204 (FIG. 2A) or by clone decoder 304 (FIG. 3A) to generate the checksum and/or the hash. Operation 604 may also include providing the checksum to multimedia content source 109 (FIG. 1) in response to queries 404 (FIG. 4), although the scope of the invention is not limited in this respect.

Operation 606 comprises receiving a hash and a delay value from the multimedia receiver over a control link. In some embodiments, the hash and delay value may be part of a response frame, such as response frame 500 (FIG. 5) and may be received in response to queries 406 (FIG. 4).

Operation 608 comprises determining the propagation delay from the delay value. In some embodiments, operation 608 may comprise verifying the hash to verify that the delay value received has not been tampered with, although the scope of the invention is not limited in this respect.

Operation 610 comprises determining when the received hash fails to match the hash generated by the decoding, and determining when a response from the multimedia receiver exceeds the propagation delay by more than a predetermined time period.

Operation 612 comprises inhibiting the further transmission of the multimedia content. Operation 612 may be performed when operation 610 determines that the received hash fails to match the hash generated by the decoding, or when the response from the multimedia receiver exceeds the propagation delay by more than the predetermined time period.

Operations 602 through 610 may be repeated when the received hash matches the hash generated by the decoding and when the response from the multimedia receiver does not exceed the propagation delay by more than the predetermined time period.

Although the individual operations of procedure 600 are illustrated and described as separate operations, one or more of the individual operations may be performed concurrently, and nothing requires that the operations be performed in the order illustrated.

Referring back to FIG. 1, in some embodiments, multimedia transmitter 101 and multimedia receiver 103 may communicate multicarrier communication signals, such as orthogonal frequency division multiplexed (OFDM) communication signals, over control link 107 and/or multimedia link 108. The multicarrier communication signals may be within a predetermined frequency spectrum and may comprise a plurality of orthogonal subcarriers. In some embodiments, multimedia transmitter 101 and multimedia receiver 103 may communicate over control link 107 and/or multimedia link 108 in accordance with a multiple access technique, such as orthogonal frequency division multiple access (OFDMA), although the scope of the invention is not limited in this respect. In some embodiments, multimedia transmitter 101 and multimedia receiver 103 may communicate over control link 107 and/or multimedia link 108 using spread-spectrum signals, although the scope of the invention is not limited in this respect.

In some embodiments, multimedia transmitter 101 and/or multimedia receiver 103 may be part of a communication station, such as a wireless local area network (WLAN) communication station including a WiFi communication station, an access point (AP) or a mobile station (MS). In some other embodiments, multimedia transmitter 101 and/or multimedia receiver 103 may be part of a broadband wireless access (BWA) network communication station, such as a Worldwide Interoperability for Microwave Access (WiMax) communication station, although the scope of the invention is not limited in this respect as multimedia transmitter 101 and/or multimedia receiver 103 may be part of almost any wireless communication device.

In some embodiments, multimedia transmitter 101 and/or multimedia receiver 103 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, or other device that may receive and/or transmit information wirelessly.

In some embodiments, the frequency spectrums for control link 107 and/or multimedia link 108 may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some wireless access network embodiments, the frequency spectrum for control link 107 and/or multimedia link 108 may comprise microwave frequencies between 2 and 11 GHz, although the scope of the invention is not limited in this respect.

In some embodiments, multimedia transmitter 101 and/or multimedia receiver 103 may communicate over control link 107 in accordance with specific communication standards, such as the Institute of Electrical and Electronics Engineers (IEEE) standards including IEEE 802.11(a), 802.11(b), 802.11 (g), and/or 802.11 (n) standards and/or proposed specifications for wireless local area networks, although the scope of the invention is not limited in this respect as they may also be suitable to transmit and/or receive communications in accordance with other techniques and standards. In some wireless access network embodiments, multimedia transmitter 101 and/or multimedia receiver 103 may communicate over control link 107 and/or multimedia link 108 in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange Between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

In some embodiments, multimedia transmitter 101 and/or multimedia receiver 103 may communicate over control link 107 in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In some other embodiments, multimedia transmitter 101 and/or multimedia receiver 103 may communicate over control link 107 in accordance with an ultra-wideband (UWB) communication technique where a carrier frequency is not used. In some embodiments, multimedia transmitter 101 and/or multimedia receiver 103 may communicate over control link 107 in accordance with an analog communication technique. In some embodiments, multimedia transmitter 101 and/or multimedia receiver 103 may communicate over control link 107 in accordance with an optical communication technique, which may be in accordance with the Infrared Data Association (IrDA) standard. In some UWB embodiments, multimedia transmitter 101 and/or multimedia receiver 103 may communicate over control link 107 in accordance with the European Computer Manufacture's Association 386 (ECMA-386) High Rate Ultra Wideband PHY and MAC Standard (December 2005) (e.g., the WiMedia Alliance), although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware and software. Some embodiments of the invention may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a computer-readable storage medium may include read-only memory (ROM), random-access memory (RAM), magnetic disk storage media, optical storage media, and flash-memory devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A multimedia transmitter comprising:
    transmitter circuitry to transmit encrypted multimedia content over a wireless multimedia link to a multimedia receiver;
    a decoder to generate a checksum from the multimedia content and to respond to queries from a multimedia content source coupled to the multimedia transmitter with the checksum within a predetermined time period; and
    a controller, wherein in response to the queries, the controller causes the transmitter circuitry to send further queries to the multimedia receiver for a delay value secured with a hash generated by a multimedia content sink, wherein based on the delay value, the controller is to determine a propagation delay between the multimedia transmitter and the multimedia receiver and is to inhibit transmission of the multimedia content over the wireless multimedia link when a response from the multimedia receiver that includes the delay value exceeds the propagation delay by a predetermined time period.

2. The multimedia transmitter of claim 1 wherein the controller determines the propagation delay from the delay value received from the multimedia receiver within the response, the delay value being secured with the hash, and
    wherein the multimedia content source refrains from providing the encrypted multimedia content to the multimedia transmitter if a delay in receiving the checksum provided by the decoder exceeds the predetermined time period or if the checksum does not match a current checksum generated within the multimedia content source.

3. The multimedia transmitter of claim 2 further comprising an encoder to re-encrypt decrypted multimedia content provided by the decoder and provide the re-encrypted multimedia content to the transmitter circuitry,
    wherein the delay value and the hash are received over a wireless control link,
    wherein the controller is to compare the hash received over the wireless control link with a hash of both a checksum and the delay value generated by the encoder, the received hash generated from a checksum and the delay value provided by a multimedia content sink, and
    wherein the controller instructs the encoder to refrain from providing the re-encrypted multimedia content to the transmitter circuitry when the hash received over the control link does not match the hash generated by the encoder, or when the propagation delay subtracted from a delay in receiving the hash over the control link exceeds the predetermined time period.

4. The multimedia transmitter of claim 3
    wherein the controller receives responses from the multimedia receiver, the responses including a delay field comprising the delay value and a hash of both the delay value and the checksum generated by the multimedia receiver, and
    wherein the decoder is responsive to the queries received from the multimedia content source to provide a current checksum generated by the decoder to the multimedia content source.

5. The multimedia transmitter of claim 2 wherein the delay value and the hash are received over a wireless control link from the multimedia receiver,
    wherein the controller compares a hash of both the checksum and a delay value generated by the decoder with the hash received over the wireless control link, and
    wherein the controller is to inhibit the transmission of the multimedia content by the multimedia transmitter when the hashes do not match or when the propagation delay subtracted from a delay in receiving the hash from the multimedia receiver exceeds the predetermined time period.

6. The multimedia transmitter of claim 2 wherein the delay value and the hash are received over a wireless control link from the multimedia receiver, and
    wherein the hash received over the control link is either generated by a decoder within the multimedia receiver, or generated from a checksum and the delay value provided by a multimedia content sink.

7. The multimedia transmitter of claim 5 wherein the transmitter circuitry receives the encrypted multimedia content directly from the multimedia content source for subsequent re-transmission over the wireless multimedia link,
    wherein the decoder comprises a clone decoder to generate the checksums in response to the queries from the multimedia content source, and
    wherein the controller is to disable the clone decoder to inhibit the generation of a checksum by the clone decoder for providing to the multimedia content source when a hash of both the checksum and the delay value from the clone decoder does not match the hash received from the multimedia receiver over the control link.

8. The multimedia transmitter of claim 2 further comprising a wireless transceiver for communicating control information with the multimedia receiver over a wireless control link, the control link being separate from the wireless multimedia link, wherein the transceiver is to send queries to the multimedia receiver over the control link and is to receive secured responses over the control link, wherein the response includes the delay value secured with the hash, the hash comprising a hash of both the delay value and a checksum generated by either a decoder within the multimedia receiver or a multimedia content sink.

9. The multimedia transmitter of claim 8 wherein the decoder has a primary data interface to couple with a primary data interface of the multimedia content source to receive the multimedia content from the multimedia content source, and wherein the decoder has a secondary control interface to couple with a secondary control interface of the multimedia content source to receive queries from the multimedia content source and to provide responses to the queries, the responses including the checksums generated by the decoder.

10. The multimedia transmitter of claim 8 wherein the wireless multimedia link is a millimeter-wave link, and wherein the multimedia transmitter further comprises:

a directional antenna coupled to the transmitter circuitry for transmitting the encrypted multimedia data to the multimedia receiver over the wireless multimedia link; and a substantially omnidirectional antenna for communicating the control information with the multimedia receiver over the control link, wherein the transmitter circuitry transmits the encrypted multimedia data using the directional antenna at millimeter-wave frequencies, and wherein the wireless transceiver communicates the control information with the multimedia receiver over the control link at microwave frequencies.

11. The multimedia transmitter of claim 10 wherein the directional antenna comprises a steerable array antenna comprising a plurality of antenna elements.

12. A method of communicating multimedia content comprising:

transmitting encrypted multimedia content over a wireless multimedia link to a multimedia receiver;

generating a checksum by decoding the multimedia content to respond to queries from a multimedia content source within a predetermined time period;

further sending queries to the multimedia receiver in response to the queries from the multimedia content source;

receiving from the multimedia receiver a delay value secured with a hash generated from by a content sink;

determining a propagation delay associated with the wireless multimedia link from the delay value received from the multimedia receiver within a response; and inhibiting transmission of the multimedia content over the wireless multimedia link when the response from the multimedia receiver that includes the delay value exceeds a propagation delay by a predetermined time period.

13. The method of claim 12 wherein the multimedia content source refrains from providing the encrypted multimedia content if a delay in receiving the checksum exceeds the predetermined time period or if the checksum does not match a current checksum generated within the multimedia content source.

14. The method of claim 13 wherein the hash and the delay value are received over a wireless control link, wherein the method further comprises:

re-encrypting decrypted multimedia content for transmission over the wireless multimedia link;

comparing the hash received over the control link with a hash of both a checksum and a delay value generated by the re-encrypting, the received hash generated from a checksum and the delay value provided by a multimedia content sink; and refraining from providing the re-encrypted multimedia content for transmission over the wireless multimedia link when the hash received over the control link does not match the hash generated by the re-encrypting, or when the propagation delay subtracted from a delay in receiving the hash over the control link exceeds the predetermined time period.

15. The method of claim 13 further comprising:

comparing a hash generated by decoding the multimedia content with a hash received over a control link from the multimedia receiver; and inhibiting the transmission of the multimedia content when the hashes do not match or when the propagation delay subtracted from a delay in receiving the hash from the multimedia receiver exceeds the predetermined time period.

16. A multimedia communication system comprising a multimedia transmitter and a multimedia receiver, the multimedia transmitter comprising:

a decoder to generate a checksum from decryption of multimedia content and to respond to queries from a multimedia content source coupled to the multimedia transmitter with the checksum within a predetermined time period; and a transmitter controller, wherein in response to the queries, the transmitter controller causes the transmitter to send a query to the multimedia receiver for a delay value secured with a hash generated by a multimedia content sink, wherein based on the delay value, and wherein the transmitter controller is to determine a propagation delay between the multimedia transmitter and the multimedia receiver and is to inhibit transmission of the multimedia content over a wireless multimedia link when a response from the multimedia receiver that includes the delay value exceeds the propagation delay by a predetermined time period, and wherein the multimedia receiver comprises:

a receiver wireless transceiver to receive the query over the wireless control link from the multimedia transmitter; and a receiver controller to provide the hash and delay value to the multimedia transmitter over the control link in response to the query.

17. The multimedia communication system of claim 16 wherein the multimedia transmitter further comprises transmitter circuitry to transmit encrypted multimedia content over the wireless multimedia link to the multimedia receiver, and wherein the multimedia receiver further comprises receiver circuitry separate from the receiver wireless transceiver to receive encrypted multimedia content over the wireless multimedia link from the multimedia transmitter.

18. The multimedia communication system of claim 17 wherein the transmitter controller determines the propagation delay from the delay value and refrains from transmitting the encrypted multimedia content to the multimedia receiver when the hash provided in the response does not match a hash generated by the decoder of the multimedia transmitter or when a delay in receiving the hash from the multimedia receiver exceeds the propagation delay by a predetermined time period.

19. The multimedia communication system of claim 18
wherein the transmitter controller receives responses from the multimedia receiver, the responses including a delay field comprising the delay value and a hash of both the delay value and the checksum generated by the multimedia receiver, and
wherein the decoder is responsive to the queries received from the multimedia content source to provide a current checksum generated by the decoder to the multimedia content source.

20. A computer-readable storage medium that stores instructions for execution by one or more processors to perform operations comprising:
transmitting encrypted multimedia content over a wireless multimedia link to a multimedia receiver;
generating a checksum by decoding the multimedia content to respond to queries from a multimedia content source within a predetermined time period;
further sending queries to the multimedia receiver in response to the queries from the multimedia content source;
receiving from the multimedia receiver a delay value secured with a hash generated from by a content sink;
determining a propagation delay associated with the wireless multimedia link from the delay value received from the multimedia receiver within a response; and
inhibiting transmission of the multimedia content over the wireless multimedia link when the response from the multimedia receiver that includes the delay value exceeds a propagation delay by a predetermined time period.

21. The computer-readable storage medium of claim 20 wherein the multimedia content source refrains from providing the encrypted multimedia content if a delay in receiving the checksum exceeds the predetermined time period or if the checksum does not match a current checksum generated within the multimedia content source.

22. The computer-readable storage medium of claim 21 wherein the operations further comprise:
re-encrypting decrypted multimedia content for transmission over the wireless multimedia link;
comparing a hash received over a control link with a hash of both a checksum and a delay value generated by the re-encrypting, the received hash generated from a checksum provided by a multimedia content sink; and
refraining from providing the re-encrypted multimedia content for transmission over the wireless multimedia link when the hash received over the control link does not match the hash generated by the re-encrypting, or when the propagation delay subtracted from a delay in receiving the hash over the control link exceeds the predetermined time period.

23. The computer-readable storage of claim 21 wherein the operations further comprise:
comparing a hash of both the checksum and a delay value generated by decoding the multimedia content with a hash of both a checksum and the delay value received over a control link from the multimedia receiver; and
inhibiting the transmission of the multimedia content when the hashes do not match or when the propagation delay subtracted from a delay in receiving a hash of both a checksum and delay value from the multimedia receiver exceeds the predetermined time period.

* * * * *

UNITED STATES PATENT AND TRADEMARK OFFICE
CERTIFICATE OF CORRECTION

| | |
|---|---|
| PATENT NO. | : 7,765,599 B2 |
| APPLICATION NO. | : 11/463238 |
| DATED | : July 27, 2010 |
| INVENTOR(S) | : Eduardo F. Casas et al. |

It is certified that error appears in the above-identified patent and that said Letters Patent is hereby corrected as shown below:

In column 18, line 28, in Claim 23, after "storage" insert -- medium --.

Signed and Sealed this

Twelfth Day of October, 2010

David J. Kappos
*Director of the United States Patent and Trademark Office*